April 29, 1969     G. A. HATHERELL ET AL     3,441,718
STROKE COUNTING SYSTEM FOR MACHINE OPERATIONS
Filed April 6, 1966
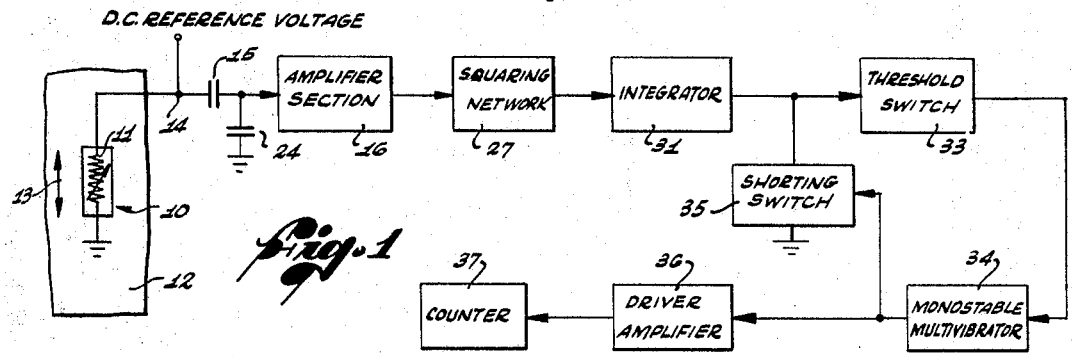
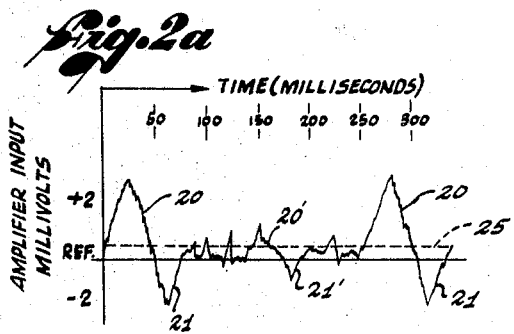
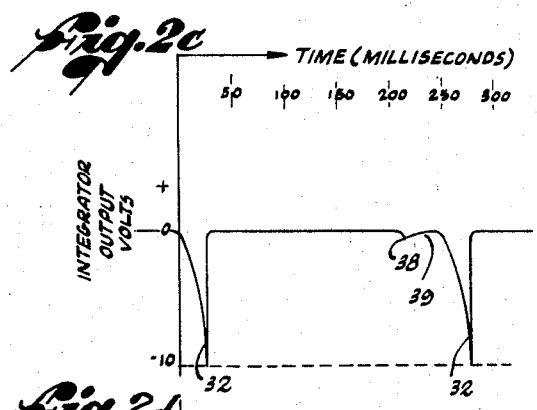
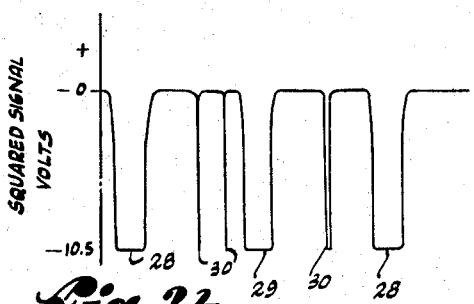
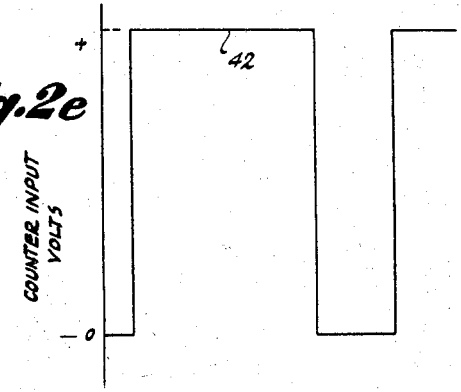
INVENTORS
GEORGE A. HATHERELL
JOHN K. FRANTZ
BY
Fulwider, Patton, Rieber,
Lee, and Utecht
ATTORNEYS United States Patent Office 3,441,718
Patented Apr. 29, 1969

3,441,718
STROKE COUNTING SYSTEM FOR
MACHINE OPERATIONS
George A. Hatherell, Sunland, and John K. Frantz,
Canoga Park, Calif., assignors to The National
Screw & Manufacturing Company, Los Angeles,
Calif., a corporation of Ohio
Filed Apr. 6, 1966, Ser. No. 540,738
Int. Cl. G06f 7/385
U.S. Cl. 235—92  8 Claims This invention relates to parts forming machines, and more particularly to an improved system for counting the operations of such machines.

Various schemes have been tried for counting machine operations. However, such schemes as heretofore known have been found unreliable. Typically, a strain gauge is mounted on the machine and coupled through an amplifier network to a counter device, which is supposed to count only the work blows of the machine.

As is well known, electrical signals which follow dimensional changes in the strain gauge are characteristically erratic. The strains set up in the gauge arise not only from work blows, but from unavoidable random vibrations of varying magnitude in the body of the machine. In general, the most pronounced excursions occur when the machine undergoes a work blow, and the amplifier network is desirably adjusted to amplify only those signals which are of such a magnitude as would be expected from a work blow.

Unfortunately, a considerable number of random noise "spikes" appear in the voltage developed from a strain gauge which approach the magnitude of those portions of a signal which represent work blows. In stroke counting systems as herefore known, it is not unusual for such transients to be counted, which of course makes the count totally false.

It is an object of our invention to provide an improved stroke counting system for machines which avoids the above and other disadvantages of the prior art.

It is another object of our invention to provide a stroke counting system which is not sensitive to random vibrations of a machine, yet reliably responds to random vibrations of a machine, yet reliably responds to and counts only the main work blows of the machine.

It is also an object of our invention to provide a stroke counting system which is formed of a minimum number of component parts of simple design, capable of reliable operation over a long operating life.

The above and other objects and advantages of this invention will become apparent from the following description taken in conjunction with the accompanying drawings of an illustrative emobidiment thereof, in which:

FIGURE 1 is a block diagram of the stroke counting system of our invention; and

FIGURES 2a–2e are graphs of waveforms of signals appearing at different portions of the system of FIGURE 1.

Referring to FIGURE 1, a strain gauge 10, symbolized as a variable resistor 11, is mounted on a portion of a parts forming machine, indicated generally at 12, which undergoes stress during forming operations. Preferably, the strain gauge 10 is oriented on a portion of the machine 12 which as indicated by the arrow 13, undergoes expansion and contraction during part forming operations, all in a well known manner. The strain gauge 10 may be any of a number of strain gauges available on the market, including the ultrasensitive types formed of semiconductor materials, e.g., silicon strain sensor elements.

As shown, the resistor 11 is connected between a point reference potential and a D-C reference voltage, such reference voltage preferably being an unvarying D-C voltage such as is provided by a regulated power supply. The junction 14 of the resistor 11 and the source of reference voltage is capacitively coupled at 15 to an amplifier section 16, whereby voltage fluctuations at the junction 14 (due to changes in the resistance of the resistor 11 as the portion of the machine 12 on which it is mounted undergoes stress) are applied to the amplifier section 16 as A-C voltages.

It will be appreciated that we are here dealing with extremely low frequency A-C voltages. When the machine 12 forms a part, e.g., heading a bolt, forming threads on a bolt, punching a part, or the like, the actual work blow may, for example, be accomplished in a period of 50 ms. (milliseconds). In such case, the voltage variation due to the work blow alone is of the order of 20 c.p.s. However, the machine frame is constantly being vibrated at higher frequencies, e.g., 10–200 c.p.s. due to unavoidable "ringing" of the frame while the machine is operating. Thus, the resistor 11 is always undergoing change while the machine is operating, so that the voltage junction 14, and hence the voltage applied to the input of the amplifier section 16, varies in accordance with this higher frequency "hash" which, of course is superimposed upon the voltage excursions representing the work blows of the machine.

FIGURE 2a illustrates the manner in which the voltage applied to the amplifier section 16 varies during and between work blows of the machine. The voltage excursions representing the work blows are indicated at 20, and as will be observed, have superimposed thereon the "hash" of varying higher frequencies. At the ends of the work blows 20, which rise to a maximum and decrease in conformance with the expansion and contraction of the frame when operating on a part, the frame undergoes further contraction, as indicated by negative voltage excursions 21, in the process of returning toward a quiescent position.

It will be observed that a number of the unwanted noise spikes reach significant magnitudes, and one function of our invention is to process the signals so as to eliminate the effects of these spikes, and prevent their being counted as work blows.

The waveform of FIGURE 2a illustrates the voltage waveform that is generated by a machine that requires two blows to form a part, e.g., as successive blows to enlarge and shape a head on one end of a bolt. As will be seen, shortly after the first work blow 20, there occurs a similar positive voltage excursion 20', immediately followed by a negative excursion 21' corresponding to the negative excursion 21 associated with the main work blow 20. While such additional or pre-forming work blows could also be counted, in which case the total count would be halved in order to arrive at the number of parts formed, we prefer to process the signals so that such auxiliary blows are ignored, and to achieve a count which is a direct representation of the number of parts actually formed.

As previously indicated, the voltage waveform depicted in FIGURE 2a is that which is achieved to the input of the amplifier section 16. At the junction 14, the voltage may include noise components of still higher frequency. However, such higher frequency components preferably are bypassed, as through a grounded capacitor 24, so that they do not appear in the input to the amplifier section 16.

The amplifier section 16 preferably is a multi-stage amplifier section having a bandpass characteristic that is substantially flat over such a frequency range as will insure the amplification of all information bearing signals, e.g., 10–200 c.p.s. Additionally, successive stages of the amplifier section 16 preferably are provided with conventional smoothing means so that the output of the amplifier section 16 is a smoothed version of the waveform of FIGURE 2a, i.e., with the "hash" removed therefrom.

The amplifier output from the amplifier section 16 is applied to a threshold squaring network 27 which is adapted to respond only to those portions of the output of the amplifier 16 which exceed a predetermined level, indicated at 25 in FIGURE 2a. As shown in FIGURE 2b, the squaring network develops rectangular waveforms 28 during the periods of the positive voltage excursions 20 in FIGURE 2a, representing the main work blows of the machine, a rectangular waveform 29 during the positive voltage excursion 20' of FIGURE 2a, representing auxiliary or pre-forming work blows, and intermediate rectangular waveforms 30 during positive-going portions of the waveform of FIGURE 2a, intermediate the work blows.

The output of the squaring network 27 is applied to an integrator 31 which develops a usable output which, as indicated by the idealized waveform of FIGURE 2c, is a charge voltage 32 which reaches a maximum during the main work blows, and which is prevented from building up during the periods between the main work blows, i.e., during the portions 29, 30 of the square wave (FIGURE 2b) which correspond, respectively, to the pre-forming blows and randomly spaced vibrations which give rise to the positive portions of the amplifier output which exceed the selected threshold level 25 (FIGURE 2a) for the squaring amplifier 27.

Development of the waveform shown in FIGURE 2c is effected trough a threshold switch 33, a monostable multivibrator 34, and a shorting switch 35. The shorting switch 35 is normally open, so that the output of the integrator 31 is applied directly to the threshold switch 33. The threshold switch, which for example may be comprised of a Zener diode does not conduct until the charging voltage 32 (FIGURE 2d) during the main work blow reaches the desired level. When such level is reached, the threshold switch 33 conducts and causes the multivibrator 34 to be triggered. Such triggering immediately flips the multivibrator to its unstable state, to connect its output to the shorting switch 35 and to the input of a driver amplifier 36 that is used to drive a counter 37.

Immediately upon the shorting switch 35 being connected to the output of the multivibrator 34, such switch is rendered operable to connect the output of the integrator 31 to ground, thereby discharging the integrator. The capacitance (not shown) between the two stages of the multivibrator is chosen to maintain the multivibrator in its unstable state for a predetermined period extending to about mid-way between the pre-forming blows and the next succeeding main work blows. In this connection, the integrator may be charged slightly, as indicated at 38 in FIGURE 2c, during brief portions 30 of the square wave (FIGURE 2b) which correspond to short-duration spikes that occur before the next main work blow. However, such a small charge is readily dissipated, as indicated at 39, before the next main blow.

The indicated selection of the time constant for the multivibrator is made to allow for variations in machine speed, and still prevent charging the integrator during the pre-forming blows. Also, it allows ample time for recovery of circuits and the counter mechanism before the next main work blow occurs.

While the multivibrator 34 is thus in its unstable state, it causes a voltage of fixed magnitude to be applied to the input of the driver amplifier 36. Such voltage is indicated in FIGURE 2d, wherein the output of the multivibrator, which in its stable state is zero volts, is lowered to a predetermined level 40 upon being triggered, such level being maintained until the end of the period dictated by the time constant built into the multivibrator, whereupon the mutivibrator flips back to its stable state, and its output returns to zero, as indicated at 41.

The driver amplifier 36 is arranged to operate the counter 37 when the multivibator is triggered. Referring to FIGURE 2e, the counter is actuated to add a digit when the input thereto moves to a predetermined level of voltage, indicated at 42. In the example shown, the input increases from zero to the level 42 when the multivibrator output moves to the level 40 (FIGURE 2d), i.e., when the charging voltage 32 reaches its maximum, indicated at −10 v. in FIGURE 2c. The counter may be an electric counter, or it may be an electromechanical device, such as a Veeder-Root counter, having a driving coil to be energized in response to the operation of the driver amplifier.

The capacitance of the integrator 31 is selected to accommodate the duration, or pulse width, of the work blow of the machine. As might be expected, the faster the machine operates, the narrower are the widths of the work blows, and the shorter are the machine cycles, thus permitting the use of small capacitors for both purposes. Similarly, much larger capacitors are required for slow acting machines, i.e., requiring work blows and machine cycles, of substantial duration. In one example, for a machine having a work blow of 5 ms. duration and a cycle time of 80–200 ms. duration, we employ a 5 mf. capacitor for the integrator, and a 10 mf. capacitor for the multivibrator. We adapt the same machine for slow operation wherein the pulse width of the work blow required is 25 ms. duration and the machine cycle time is from 0.5–1.0 second, in which case we employ a 25 mf. capacitor for the integrator, and a 75 mf. capacitor for the multivibrator.

From the foregoing, it will be apparent that various modifications can be made in the system illustrated and described without departing from the spirit and scope of our invention, which we do not intend to be limited except as by the appended claims.

We claim:

1. In a machine for performing operations on parts, the machine having a characteristic main work blow and work cycle, and the machine having a portion which undergoes minute dimensional changes, the most pronounced changes occurring during work blows, the combination of:

a strain gauge to be mounted on the aforementioned portion of the machine and adapted to undergo changes in resistance conforming to the dimensional changes thereof;
means to develop a voltage which varies in response to said changes in resistance;
electrically operative stroke counting means;
and means operable during the portion of said voltage occurring during each main work blow to operate said stroke counting means, and operable during other portions of the work cycle to prevent operation of said stroke counting means.

2. The combination of claim 1, wherein said voltage developing means includes a regulated D-C voltage source connected to said strain gauge;

and amplifier means capacitively coupled to the junction of said voltage source and strain gauge.

3. The combination of claim 2, including square wave developing means coupled to said amplifier means;

and an integrator for developing a charging voltage coupled to said square wave developing means;
said means for operating the stroke counting means responding to a predetermined charging voltage from the integrator during main work blows to operate said stroke counting means.

4. The combination of claim 3, including means for preventing build up of a charging voltage from said integrator during the portion of the work cycle following each main work blow.

5. The combination of claim 2, including an integrator for developing a charging voltage;
a squaring network connected between said amplifier means and said integrator;
a source of power for operating said stroke counting means;
and a switch responsive to a predetermined charging voltage from the integrator during main work blows to cause said source of power to be coupled to said stroke counting means.

6. The combination of claim 5, including second switching means responsive to operation of said first-mentioned switching means to discharge said integrator during the portion of the work cycle following each main work blow.

7. The combination of claim 5, including a monostable multivibrator, said switch being connected between said integrator and multivibrator and being rendered at said predetermined charging voltage to cause said charging voltage to trigger said multivibrator and place it in its unstable state;
a normally open discharge switch connected to said integrator, said multivibrator being connected to said discharge switch, said discharge switch being rendered conductive by said multivibrator in its unstable state to discharge said integrator, said multivibrator being characterized in that it remains in its unstable state for the remaining portion of the work cycle following the work blow, said source of power being coupled to said stroke counting means when said multivibrator is triggered to its unstable state.

8. The combination of claim 5, wherein said stroke counting means includes a counter;
and a driver amplifier connected between said multivibrator and said counter.

References Cited
UNITED STATES PATENTS

| | | | |
|---|---|---|---|
| 3,095,733 | 7/1963 | Son Sjöström | 73—91 |
| 3,184,725 | 5/1965 | Siegel. | |
| 3,188,451 | 6/1965 | Henry. | |
| 3,381,526 | 5/1968 | Rastogi | 73—91 |

MAYNARD R. WILBUR, *Primary Examiner.*

G. J. MAIER, *Assistant Examiner.*

U.S. Cl. X.R.

73—91

PO-1050
(5/69)

UNITED STATES PATENT OFFICE
CERTIFICATE OF CORRECTION

Patent No. 3,441,718          Dated April 29, 1969

Inventor(s) Hatherell et al

It is certified that error appears in the above-identified patent and that said Letters Patent are hereby corrected as shown below:

Column 6, line 7, after "claim", delete "5" and substitute therefor --7--.

SIGNED AND
SEALED
APR 7 1970

(SEAL)
Attest:

Edward M. Fletcher, Jr.
Attesting Officer

WILLIAM E. SCHUYLER, JR.
Commissioner of Patents